United States Patent [19]

Warfel

[11] 4,332,760
[45] Jun. 1, 1982

[54] DIRECT PRODUCTION OF ELASTOMER COMPOUND FROM REACTOR SOLUTION

[75] Inventor: David R. Warfel, Exton, Pa.

[73] Assignee: Atlantic Richfield Company, Los Angeles, Calif.

[21] Appl. No.: 248,138

[22] Filed: Mar. 30, 1981

[51] Int. Cl.³ .................. B02C 18/00; C08L 9/00; B28B 3/00
[52] U.S. Cl. ................... 264/143; 264/142; 264/211; 264/319; 524/340; 525/99; 528/502
[58] Field of Search ............. 264/142, 143, 211, 319; 260/33.6 AQ; 528/502; 525/99

[56] References Cited

U.S. PATENT DOCUMENTS

| | | | |
|---|---|---|---|
| 3,036,056 | 5/1962 | Rion | 528/502 |
| 3,280,084 | 10/1966 | Zelinski et al. | 260/83.7 |
| 3,281,383 | 10/1966 | Zelinski et al. | 260/23.7 |
| 3,409,712 | 11/1968 | Chisholm | 264/142 |
| 3,485,787 | 12/1969 | Haefele et al. | 260/33.6 |
| 3,577,494 | 9/1969 | Chisholm et al. | 264/143 |
| 3,637,554 | 1/1972 | Childers | 260/23.7 |
| 3,642,964 | 2/1972 | Rausch et al. | 264/143 |
| 3,673,126 | 6/1972 | Carmody et al. | 264/143 |
| 3,832,433 | 8/1974 | Schaffer et al. | 264/143 |
| 3,985,830 | 10/1976 | Fetters et al. | 260/880 |
| 4,107,124 | 8/1978 | Himes | 260/33.6 AQ |
| 4,117,037 | 9/1978 | Himes | 525/99 |
| 4,141,876 | 2/1979 | Hansen | 260/33.6 |
| 4,158,689 | 6/1979 | Pett et al. | 260/33.6 AQ |
| 4,209,594 | 6/1980 | Welch et al. | 260/33.6 AQ |
| 4,216,132 | 8/1980 | Zweig et al. | 260/33.6 AQ |

OTHER PUBLICATIONS

Chem. Abs., vol. 82-5225e (1975), French Oil Mill Machinery, "Treating Elastomeric Materials".
Chem. Abs., vol. 77-20692v (1972), Fr. Oil Mill, "Apparatus for Continuously Removing Volatile Solvents from a Polymer".

Primary Examiner—John C. Bleutge
Assistant Examiner—Herbert J. Lilling
Attorney, Agent, or Firm—Lewis J. Young

[57] ABSTRACT

A method of preparing oil-extended elastomer and shoe sole compound as an integral part of the anionic polymerization process for making elastomer is presented. The method eliminates the step of isolating the neat elastomer and of reheating the elastomer to compound it into the final product.

2 Claims, No Drawings

DIRECT PRODUCTION OF ELASTOMER COMPOUND FROM REACTOR SOLUTION

BACKGROUND OF THE INVENTION

The present invention relates to the field of thermoplastic elastomer compounds useful in molding of shoe soles, alloys and adhesives.

Highly branched block copolymers, sometimes called star-block copolymers, are old in the art of anionic polymerization. These star-block copolymers are prepared by first forming linear block polymers having active lithium atom on one end of the polymer chain. These active linear polymer chains are then coupled by the addition of a polyfunctional compound having at least three reactive sites capable of reacting with the carbon to lithium bond on the polymer chains to add the polymer chain into the functional groups of the compound.

Zelinski, U.S. Pat. No. 3,280,084, polymerized butadiene with butyllithium initiator to form B-Li blocks (where B is polybutadiene) which when coupled with 0.02 to 1 part by weight per 100 parts of monomers of divinylbenzene gave star-block copolymers having polydivinylbenzene nuclei and several identical arms of polybutadiene branching therefrom. The arms can also be either random or block copolymers of styrene and butadiene (from A-B-Li blocks, where A is polystyrene segment) where the diene is the major component.

Zelinski, U.S. Pat. No. 3,281,383, teaches similar star-block copolymers to those in U.S. Pat. No. 3,280,084, except that coupling agents such as polyepoxy compounds, polyacids, polyaldehydes, etc., are used.

Haefele et al, U.S. Pat. No. 3,485,787, produces elastomeric compositions by blending mineral oils with thermoplastic linear triblock copolymers by milling the ingredients.

Childers, U.S. Pat. No. 3,637,554, prepares rubbery star-block copolymers having nuclei formed from polyepoxides, polyisocyanates, polyimines, etc., and identical arms from B-Li and A-B-Li.

Fetters et al, U.S. Pat. No. 3,985,830, discloses a product having a nucleus of more than one molecule of m-divinylbenzene and at least three polymeric arms, each being a block copolymer of conjugated diene and monovinyl aromatic monomers wherein said conjugated diene block is linked to said nucleus.

Himes, U.S. Pat. No. 4,107,124, teaches compositions comprising star-block copolymers, polystyrenes, mineral oil, and a finely divided filler for use in shoe sole compositions. The ingredients are blended in an extruder, a Banbury mixer or by dry-blending.

Hansen, U.S. Pat. No. 4,141,876, produces adhesive compositions by melt-blending a hydrogenated star-block copolymer with mineral oil, a polyphenylene ether resin and a tackifying resin.

The thermoplastic elastomers are prepared by polymerization of monomers in inert solvent. The product elastomers are normally separated from the solvent by steamstripping the unreacted monomers, coagulating the polymer with water and separating the wet polymer as a crumb. The crumb is deashed, dried of solvent and water and sold loose or converted to pellets by extrusion or powder by grinding.

The neat elastomer, as crumb, pellets or powder must then be blended with the ingredients necessary to form either oil-extended elastomer or shoe sole compound. A typical shoe sole compound comprises for each 100 parts by weight of neat elastomer, 50–200 parts extender oils, 25–150 parts reinforcing fillers or pigments, 50–200 parts polystyrene materials and 0.1–2.0 parts stabilizers.

The blending process requires that the neat elastomer be isolated from its polymerization medium and then remelted during the blending to insure good mixing of the ingredients of the shoe sole formulation or compound.

SUMMARY OF THE INVENTION

It has now been found that oil extended elastomer or the shoe-sole compound can be formulated without isolation of the neat elastomer from the solvent of the polymerization process.

The neat elastomer can be combined with extender oil while the elastomer is still in the inert solvent in which it is prepared. The mixture is then extruded through a devolatilizing extruder to remove the solvent and to produce the oil extended elastomer.

Further, the oil can be added along with polystyrene material, inorganic fillers, antioxidants and stabilizers to form, on devolatilization, a shoe-sole compound or adhesive compound as desired. The extrusion not only serves to remove the inert solvent, but the extruded strands can be chopped, or pelletized, to form a convenient, commercially attractive form of the compound.

DETAILED DESCRIPTION OF THE INVENTION

The base thermoplastic elastomer used in the present invention may be any of the A-B-$(B-A)_n$ block copolymers where A represents a monovinyl aromatic compound block, B represents a conjugated diene block and n is an integer of 1 to 20. Obviously, this includes both linear triblock and radial or star-block copolymers.

The copolymers contain 25 to 55 percent by weight, preferably 30 to 50 percent by weight, or a monovinyl aromatic compound and 45 to 75 percent by weight, preferably 50 to 70 percent by weight, of a conjugated diene having 4 to 8 carbon atoms.

The monovinyl aromatic compound is preferably styrene, but may be alkyl substituted styrenes which have similar copolymerization charcteristics, such as, alphamethylstyrene and the ring substituted methylstyrenes, ethylstyrenes and t-butylstyrene.

The amount of monovinyl aromatic compound useful in the invention is between 25 and 55 percent by weight, and preferably 30 to 50 by weight, based on the total weight of monomers utilized.

The hydrocarbyllithium initiators useful in the polymerization are the known alkyllithium compounds, such as methyllithium, n-butyllithium, sec-butyllithium; the cyclo-alkyllithium compounds, such as cyclo-hexyllithium; and the aryllithium compounds, such as phenyllithium, p-tolyllithium and naphthyllithium.

The amounts of hydrocarbyllithium added should be between 0.2 and 10.0 millimoles per mole of monomer. The total amount of initiator used depends on the molecular weight and number of polymer chains desired.

The conjugated dienes are those having from 4 to 8 carbon atoms in the molecule, such as 1,3-butadiene, isoprene, 2,3-dimethyl-1,3-butadiene, piperylene and mixtures thereof.

The polymerization is conducted in an inert hydrocarbon solvent such as isobutane, pentane, cyclohexane, benzene, toluene, xylene and the like. The polymerization is carried out in the absence of air, moisture or any other impurity which is known to be detrimental to anionic catalyst systems. The temperature of polymerization may be conventionally from 0° to 120° C., and preferably between 40° and 80° C.

The polyfunctional coupling agents may be the polyvinyl aromatic compounds such as divinylbenzene, which although only difunctional, as monomers, can polymerize to form polyfunctional agents in situ and serve as coupling agents. Suitable are the ortho-, meta-, or para-divinylbenzenes, or mixtures thereof.

In the case of difunctional agents which polymerize during the coupling reaction, such as divinylbenzene, the amounts of agent to be used must be determined for the conditions of reaction, since the number of equivalent functional sites is variable. However, the amounts will vary only from 0.5 to 3.5 parts by weight, and preferably 0.8 to 2.0 parts by weight, of divinylbenzene per 100 parts by weight of total monomers.

The extender oils useful in this invention, usually referred to as paraffinic/naphthenic oils, are usually fractions of refined petroleum products. Commercial extender oils include the Shellflex ® oils manufactured by Shell Chemical Company and the Tufflo ® oils manufactured by ARCO Petroleum Products Company. These oils are used in amounts between 50 and 200 parts per hundred of elastomer (phr).

The polystyrene material may be selected from the low molecular weight polystyrenes, poly-α-methylstyrenes, polyvinyltoluenes, polyindene resins, coumarone-indene resins and mixtures of these. The amount of polystyrene material used may vary from 0–250 phr, preferably 50–200 phr.

The inorganic fillers are well known in the art of both shoe sole compounds and adhesives. These include talc, clays, silica, titanium dioxide, calcium carbonate and other pigmenting additives such as carbon black. The amount of filler used depends on the final use of the compounded elastomer, but generally varies from 0–200 phr, preferable 25–150 phr.

The stabilizers used may be any one or a combination of more than one of the known antioxidants, ultraviolet stabilizers and heat stabilizers. These are used in minor amounts of between 0 and 3.0 phr, preferably from 0.1 to 2.0 phr.

In the process of this invention, the base thermoplastic elastomer is prepared by polymerizing the appropriate monomers in an inert solvent. Then, without cooling the polymer/solvent mixture, the mixture is immediately transferred to a mixing tank and the mineral oil, reinforcing resins, inorganic fillers, antioxidants and stabilizers are added and dispersed with mixing. The dispersion is then pumped directly to a devolatilizing extruder and extruded into a strand while removing the inert solvent from the mixture through the devolatilizing parts of the extruder. The resulting devolatilized strand of shoe sole compound is then chopped into pellets which are suitable for use in shoe sole molding applications.

If only the oil is added to the elastomer/solvent mixture prior to devolatilization, the product is an oil-extended thermoplastic elastomer useful for later compounding.

The following examples are given to illustrate the invention, but not to limit the claims. All parts and percentages are by weight unless otherwise specified.

EXAMPLE I

A one gallon stirred reactor was charged with 2,000 g of purified cyclohexane and heated to 60° C. A trace of diphenylethylene (0.2 g) was added to te cyclohexane by means of a hypodermic needle. A solution of sec-butyllithium in cyclohexane was added to the reactor portionwise until a permanent orange-yellow color was obtained. The solution was then backtitrated with cyclohexane until the color just disappeared. The solvent and reactor were now ready for the polymerization of monomer. Into the closed reactor was charged 13.7 m moles of sec-butyllithium and 307 g of styrene and the reactor held at 60° C. for 20 minutes. Analysis of the solution by U.V. analysis showed that less than 0.01% by weight of the styrene monomer remained. Number average molecular weights ($M_n$) of the polystyrene blocks were determined by Gel Permeation Chromatography to be 28,000. At this point, 361 g of butadiene was added to the reactor and the whole mixture held for 60 minutes to complete the polymerization of the butadiene. The diblock arms thus formed were analyzed by refractive index and found to be 46% by weight styrene and 54% butadiene. There was then added 14.7 g of divinylbenzene of 53% purity and the whole was held for 1–2 hours at 70° C. to complete the linking reaction. The system was terminated by the addition of 1 g of methanol.

The resulting star-block polymer was found to have about 8 linear arms. Each arm has $M_n$ of about 60,900, made up of a polystyrene block of $M_n$ 28,000 and a polybutadiene block of $M_n$ 32,900. The divinylbenzene was used in an amount of 1.2 parts per hundred of monomer (phm).

The polymer/solvent mixture was transferred to a mixing tank where 670 g cyclohexane was added to produce a solution containing 20% solids. The mixture was maintained at 65° C. while 334 g of a mineral oil, Shellflex 311 (a naphthenic mineral oil sold by Shell Chemical Company) was added and completely dissolved into the polymer/solvent mixture. The resulting solution was then pumped into a devolatilizing extruder where the solvent was removed through the devolatilizing vents while the oil-extended elastomer was extruded as a strand and pelletized. The resulting pellets contain a 2:1 ratio of elastomer:oil and were labeled "I" for future reference.

Comparative Example A

The star-block elastomer was prepared as in Example I up through the point of termination of the polymerization with methanol. The polymer solution was transferred to a 5 gallon polyethylene liner, diluted further with acetone and the polymer was precipitated by adding isopropanol under high speed stirring. The polymer was then treated with 0.5 part Polygard HR, a commercial antioxidant, and 0.5 part 2,6-ditert-butyl-4-methylphenol per 100 parts by weight of polymer. The wet polymer was dried at 50° C. in an oven under vacuum at less than 100 microns of mercury to form neat elastomer.

Oil-extended, star-block copolymer was prepared by placing the neat elastomer in a 1 gallon screw cap jar and redissolving in sufficient cyclohexane to produce a 15% by weight solids solution. Enough oil to give a mixture of 50 parts of oil per hundred parts of elastomer (phr) was then added and the jar was rolled until the oil and elastomer were completely mixed. The mineral oil added was Shellflex 311, a naphthenic mineral oil sold by Shell Chemical Company. The oil-elastomer-cyclohexane solution was dried in a vacuum oven following the same procedure used for drying neat polymer, above. The oil-extended product was labeled "A" for future reference. This product also had a 2:1 ratio of elastomer:oil.

Physical Properties

The physical properties of the oil-extended elastomers I and A were determined and were found to be as follows:

TABLE I

| Sample | I | A |
| --- | --- | --- |
| Tensile Strength, 300% Elong. (psi) | 240 | 270 |
| Tensile Strength, Break (psi) | 2210 | 2080 |
| Elongation, Break (%) | 990 | 945 |
| Permanent Set At 10 Minutes (%) | 31.1 | 27.1 |

As can be seen, the properties of the two oil-extended elastomers are essentially equivalent. The method of the invention produces a product at considerable savings in manufacturing effort and cost, yet having comparable properties.

EXAMPLE II

A one gallon stirred reactor was charged with 2,000 g of purified cyclohexane and heated to 60° C. A trace of diphenylethylene (0.2 g) was added to te cyclohexane by means of a hypodermic needle. A solution of sec-butyllithium in cyclohexane was added to the reactor portionwise until a permanent orange-yellow color was obtained. The solution was then backtitrated with cyclohexane until the color just disappeared. The solvent and reactor were now ready for the polymerization of monomer. Into the closed reactor was charged 13.7 m moles of sec-butyllithium and 307 g of styrene and the reactor held at 60° C. for 20 minutes. Analysis of the solution by U.V. analysis showed that less than 0.01% by weight of the styrene monomer remained. Number average molecular weights ($M_n$) of the polystyrene blocks were determined by Gel Permeation Chromatography to be 28,000. At this point, 361 g of butadiene was added to the reactor and the whole mixture held for 60 minutes to complete the polymerization of the butadiene. The diblock arms thus formed were analyzed by refractive index and found to be 46% by weight styrene and 54% butadiene. There was then added 14.7 g of divinylbenzene of 53% purity and the whole was held for 1-2 hours at 70° C. to complete the linking reaction. The system was terminated by the addition of 1 g of methanol.

The resulting star-block polymer was found to have about 8 linear arms. Each arm has $M_n$ of about 60,900, made up of a polystyrene block of $M_n$ 28,000 and a polybutadiene block of $M_n$ 32,900. The divinylbenzene was used in an amount of 1.2 parts per hundred of monomer (phm).

The polymer/solvent mixture was transferred to a mixing tank where 670 g cyclohexane was added to produce a solution containing 20% solids. The mixture was maintained at 65° C. while 334 g of a mineral oil, Shellflex 311 (a naphthenic mineral oil sold by Shell Chemical Company) was added and completely dissolved into the polymer/solvent mixture. After a uniform solution was obtained, the organic soluble ingredients (i.e., 22.0 phr polystyrene, 11.5 phr Resin 18-290, 0.3 phr Irganox 1010, 0.3 phr Tinuvin P and 0.3 phr DLTDP) were added in amounts shown in the formulation below. Then the inorganic fillers (19.2 phr Hi-Sil 233) were added and stirring continued until a uniform dispersion was obtained. The resulting dispersion was then pumped into a 0.8" devolatilizing extruder where the solvent was removed through the devolatilizing vents while the shoe sole compound was extruded at 138° C. as a strand and pelletized. The resulting pellets were designated "Compound II".

Comparative Example B

The star-block elastomer was prepared as in Example I up through the point of termination of the polymerization with methanol. The polymer solution was transferred to a 5 gallon polyethylene liner, diluted further with acetone and the polymer was precipitated by adding isopropanol under high speed stirring. The polymer was then treated with 0.5 part Polygard HR, a commercial antioxidant, and 0.5 part 2,6-ditert-butyl-4-methylphenol per 100 parts by weight of polymer. The wet polymer was dried at 50° C. in an oven under vacuum at less than 100 microns of mercury to form neat elastomer.

Oil-extended, star-block copolymer was prepared by placing the neat elastomer in a 1 gallon screw cap jar and redissolving in sufficient cyclohexane to produce a 15% by weight solids solution. Enough oil to give a mixture of 50 parts of oil per hundred parts of elastomer (phr) was then added and the jar was rolled until the oil and elastomer were completely mixed. The mineral oil added was Shellflex 311, a naphthenic mineral oil sold by Shell Chemical Company. The oil-elastomer-cyclohexane solution was dried in a vacuum oven following the same procedure used for drying neat polymer, above.

A shoe sole compound, B, was prepared by melt-blending ingredients as follows:

| Ingredient | Parts (By Weight) |
| --- | --- |
| Elastomer/Oil (2:1 ratio) | 100.0 |
| Shellflex 311 Oil | 53.7 |
| Crystal Polystyrene | 22.0 |
| Resin 18-290 | 11.5 |
| Hi-Sil 233 | 19.2 |
| Tinuvin P | 0.3 |
| Irganox 1010 | 0.3 |
| DLTDP | 0.3 |

The crystal polystyrene used was Cosden 500S, a crystal polystyrene containing 6% oil sold by Cosden Chemical Co. Resin 18-290 is a poly-α-methylstyrene resin of molecular weight 960 and softening point of about 141° C., sold by Amoco Chemicals Corporation. Hi-Sil 233 is an amorphous silica sold by PPG Industries. Irganox 1010 is a hindered phenol antioxidant sold by Ciba-Geigy Corp. DLTDP is the stabilizer, dilaurylthiodiproprionate, sold by Cincinnati Milacron. Tinuvin P is a light stabilizer sold by Ciba-Geigy Corp. The resulting shoe sole compound had the same final composition as the "Compound II" made by the process of this invention.

The properties of the shoe sole compounds were measured on compression molded plaques which were prepared at 140° C. The Ross flexural test was determined by ASTM-D-1052. The Shore A hardness values were determined on an A-2 Durometer 10 seconds after initial contact with the plaque. The tensile strengths and elongation were determined by by ASTM-D412 at a test rate of 20 in/min. The melt index was determined by ASTM-D1238-65T at 190° C. under a load of 2.16 Kg. The results are shown in Table II.

TABLE II

| Sample | Compound II | Compound B |
|---|---|---|
| Shore A Hardness | 48 | 46 |
| Ross Flextural Test ($\times 10^{-5}$) | 7.78 | 4.20 |
| Adhesion | 48 | 45-55* |
| Tensile Strength, 300% Elong (psi) | 325 | 380 |
| Tensile Strength, Break (psi) | 335 | 390 |
| Elongation, Break (%) | 430 | 430 |
| Melt Index (E) | 4.1 | 6.6 |

*Nominal values on similar materials.

Once again the process of this invention gave Compound II directly from the polymerization reactor which has properties comparable to Compound B made by separation of neat elastomer, oil-extending, reheating to melt blend the elastomer, oil and and formulation ingredients and pelletizing.

I claim:

1. A method of preparing oil-extended elastomer in pellet form consisting essentially of
   a. polymerizing from 25 to 55% by weight of a monovinyl aromatic compound and 45 to 75% by weight of a conjugated diene in an inert solvent to form a base thermoplastic elastomer of formula A—B—(B—A)$_n$, where A is a monovinyl aromatic compound block, B is a conjugated diene block, and n is an integer from 1 to 20;
   b. adding to the elastomer-solvent mixture an extender oil, and dispersing the resulting mixture;
   c. pumping the dispersion to a devolatilizing extruder;
   d. extruding the mixture into a strand while removing the solvent from the mixture; and
   e. chopping the resulting strands to form pellets suitable for use in shoe sole molding applications.

2. A method of preparing shoe sole compound in pellet form consisting essentially of
   a. polymerizing from 25 to 55% by weight of a monovinyl aromatic compound and 45 to 75% by weight of a conjugated diene in an inert solvent to form a base thermoplastic elastomer of formula A—B—(B—A)$_n$, where A is a monovinyl aromatic compound block, B is a conjugated diene block, and n is an integer from 1 to 20;
   b. adding to the elastomer-solvent mixture an extender oil, reinforcing resins, inorganic fillers, antioxidants and stabilizers; and dispersing the resulting mixture;
   c. pumping the dispersion to a devolatilizing extruder;
   d. extruding the mixture into a strand while removing the solvent from the mixture; and
   e. chopping the resulting strands to form pellets suitable for use in shoe sole molding applications.

* * * * *